United States Patent
Hari et al.

[11] 3,891,685
[45] June 24, 1975

[54] AZOMETHINE COPPER COMPLEX DYES AND PROCESS FOR THEIR PREPARATION

[75] Inventors: Stefan Hari, Allschwil; Karl Ronco, Riehen, both of Switzerland

[73] Assignee: Ciba-Geigy Corporation, Ardsley, N.Y.

[22] Filed: Dec. 12, 1972

[21] Appl. No.: 314,283

[30] Foreign Application Priority Data
Dec. 13, 1971 Switzerland.................... 18146/71

[52] U.S. Cl. .......... 260/438.1; 260/39 P; 260/40 R; 260/42.21; 260/270 R; 260/310; 260/329 MF; 260/332.2 R; 260/346.1 M; 260/429 C
[51] Int. Cl. ............................................. C07f 1/08
[58] Field of Search ..................... 260/438.1, 429 C

[56] References Cited
UNITED STATES PATENTS

| | | | |
|---|---|---|---|
| 3,687,991 | 8/1972 | Gaeng et al. | 260/438.1 X |
| 3,700,709 | 10/1972 | Inman et al. | 260/438.1 |
| 3,723,490 | 3/1973 | Inman et al. | 260/438.1 |

*Primary Examiner*—Helen M. S. Sneed
*Attorney, Agent, or Firm*—Vincent J. Cavalieri

[57] ABSTRACT

Copper complexes of azomethine dyestuffs of the formula

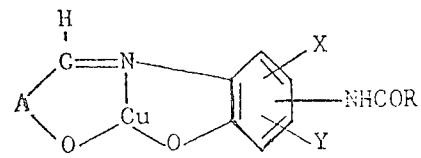

wherein A is

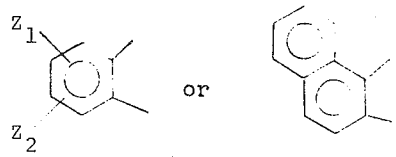

R is alkyl of 1 to 4 carbon atoms, alkoxy of 1 to 4 carbon atoms, phenyl, benzyl, phenylethyl, styryl or phenylamino unsubstituted or substituted by chloro, bromo, alkyl of 1 to 4 carbon atoms, or alkoxy of 1 to 4 carbon atoms, X, Y, $Z_1$ and $Z_2$ is hydrogen, chloro, bromo, alkyl of 1 to 4 carbon atoms, alkoxy of 1 to 4 carbon atoms, or nitro.

The dyestuffs can be used especially for pigmenting high molecular organic material.

5 Claims, No Drawings

AZOMETHINE COPPER COMPLEX DYES AND PROCESS FOR THEIR PREPARATION

It has been found that new valuable copper complexes of azomethine dyestuffs of the formula

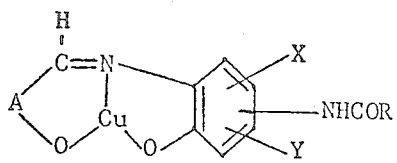

(I)

wherein A denotes a carbocyclic or heterocyclic aromatic radical in which the methine group and the O-atom are in the o-position to one another, R denotes an optionally substituted alkyl, alkenyl, alkoxy, aralkyl, aralkenyl or arylamino group or a heterocyclic radical, are obtained if a Schiff's base of the formula

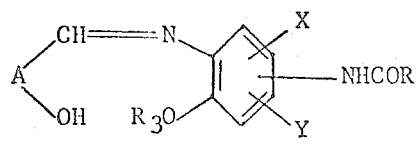

(II)

wherein A, R, X and Y have the indicated meaning and $R_3$ denotes a hydrogen atom or an alkyl group, is reacted with a copper-donating agent.

Compounds of particular interest are those of the formula

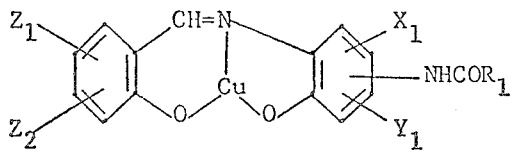

(III)

wherein $R_1$ denotes an alkyl or alkoxy group containing 1-4 C atoms, a benzyl, phenylethyl, styryl or phenylamino group optionally substituted by halogen atoms or alkyl or alkoxy groups containing 1-4 C atoms, or a heterocyclic radical and $X_1$ and $Y_1$ and $Z_1$ and $Z_2$ denotes hydrogen or halogen atoms, alkyl or alkoxy groups containing 1 to 4 carbon atoms, or nitro groups.

$R_1$ for example denotes a methyl, ethyl, propyl, methoxy or ethoxy group.

Further preferred compounds are those of the formula

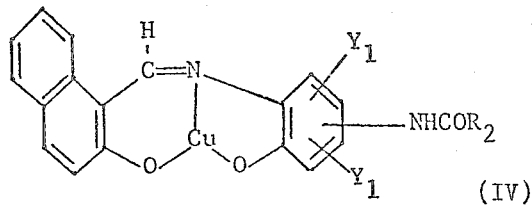

(IV)

wherein $X_1$ and $Y_1$ have the indicated meaning and $R_2$ denotes an alkyl or alkoxy group containing 1-4 C atoms, a phenyl, benzyl, phenylethyl, styryl or phenylamino group which is optionally substituted by halogen atoms or alkyl or alkoxy groups containing 1-4 C atoms, or a heterocyclic radical.

The Schiff's bases which serve as starting substances preferably correspond to the formula

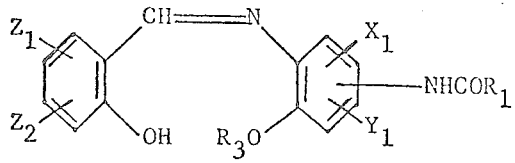

or

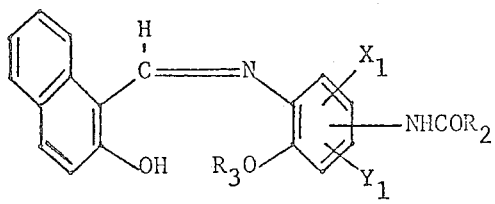

(V)

wherein $R_1$, $R_2$, $X_1$, $Y_1$, $Z_1$ and $Z_2$ have the indicated meaning and $R_3$ denotes an alkyl group containing 1 to 4 carbon atoms.

The Schiff's bases are obtained according to known processes by condensation of a carbocyclic or heterocyclic aromatic o-hydroxy-aldehyde with an amine of the formula

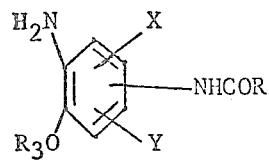

(VI)

Since the o-aminophenols are compounds which are sensitive to oxidation it is more advantageous to use the corresponding o-aminophenol ethers, especially the 1-amino-2-methoxybenzenes, as starting substances.

The following o-hydroxy-aldehydes may be mentioned as examples: 2-hydroxybenzaldehyde, 4-chloro-2-hydroxybenzaldehyde, 5-chloro-2-hydroxybenzaldehyde, 3-nitro-2-hydroxybenzaldehyde, 5-nitro-2-hydroxybenzaldehyde, 3,5-dichloro-2-hydroxybenzaldehyde, 3,5-dibromo-2-hydroxybenzaldehyde, 5-phenylazo-2-hydroxybenzaldehyde, 5-(p-nitrophenylazo)-2-hydroxybenzaldehyde, 2-hydroxynaphthaldehyde, 6-bromo-2-hydroxynaphthaldehyde, 5-nitro-2-hydroxynaphthaldehyde, 1-hydroxy-4-chloro-2-naphthaldehyde, 1-phenyl-3-methyl-4-formyl-pyrazolone-(5), 2,6-dihydroxy-3-formyl-4-methyl-5-cyano-pyridine and 3-methoxysalicylaldehyde.

As examples of o-alkoxy-anilines there may be mentioned: 1-amino-2-methoxy-5-acetylaminobenzene, 1-amino-2-methoxy-5-propionylaminobenzene, 1-amino-2-methoxy-5-butyrylaminobenzene, 1-amino-2-methoxy-5-benzoylaminobenzene, 1-amino-2-methoxy-5-(o-chlorobenzoylamino)-benzene, 1-amino-2-methoxy-5-(p-chlorobenzoylamino)-benzene, 1-amino-2-methoxy-5-(2',4'-dichlorobenzoylamino)-benzene, 1-amino-2-methoxy-5-(2'-thienylamino)-benzene, 1-amino-2-methoxy-5-(2'-furoylamino)-benzene, 1-amino-2-methoxy-4-acetylaminobenzene, 1-amino-2-methoxy-4benzoylaminobenzene, 1-amino-2-methoxy-4-(o-chlorobenzoylamino)-benzene, 1-amino-2-methoxy-4-(p-chlorobenzoylamino)-benzene, 1-amino-2-methoxy-4-(2',4'-dichlorobenzoylamino)-benzene, 1-amino-2-methoxy-4-(o-methylbenzoylamino)-benzene, 1-amino-2-methoxy-4-(p-methylbenzoylamino)-benzene, 1-amino-2-methoxy-4-(o-methoxybenzoylamino)-benzene, 1-amino-2-methoxy-5-(o-methylbenzoylamino)-benzene, 1-amino-2-methoxy-5-(p-methylbenzoylamino)-benzene, 1-amino-2-methoxy-5-(o-methoxybenzoyl-amino)-benzene, 1-amino-2-methoxy-5-(p-methoxybenzoylamino)-benzene, 1-amino-2-methoxy-3-acetylaminobenzene, 1-amino-2-methoxy-3-benzoylaminobenzene, 1-amino-2-methoxy-6-acetylamino-benzene, 1-amino-2-methoxy-6-benzoylaminobenzene, 1-amino-2-methoxy-5-methoxycarbonylaminobenzene, 1-amino-2,5-dimethoxy-4-acetylaminobenzene, 1-amino-2,5-dimethoxy-4-propionylamino-benzene, 1-amino-2,5-dimethoxy-4-benzoylaminobenzene, 3-amino-4-methoxy-carbanilic acid benzyl ester, 3-amino-4-methoxy-carbanilide, 1-amino-2,5-dimethoxy-4-(o-chlorobenzoylamino)-benzene, 1-amino-2,5-dimethoxy-4-(p-chlorobenzoylamino)-benzene, 1-amino-2,5-dimethoxy-4-(2',4'-dichlorobenzoylamino)-benzene, 1-amino-2,5-dimethoxy-4-(o-methylbenzoylamino)-benzene, 1-amino-2,5-dimethoxy-4-(p-methylbenzoylamino)-benzene, 1-amino-2,5-dimethoxy-3-acetylaminobenzene, 1-amino-2,5-dimethoxy-3-benzoylaminobenzene, 1-amino-2-methoxy-5-methyl-4-acetylaminobenzene, 1-amino-2-methoxy-5-methyl-4-propionylaminobenzene, 1-amino-2-methoxy-5-methyl-4-benzoylaminobenzene, 1-amino-2-methoxy-5-methyl-4-(o-chlorobenzoylamino)-benzene, 1-amino-2-methoxy-5-methyl-4-(p-chlorobenzoylamino)-benzene, 1-amino-2-methoxy-5-methyl-4-(2',4'-dichlorobenzoylamino)-benzene, 1-amino-2-methoxy-5-methyl-4-(o-methylbenzoylamino)-benzene, 1-amino-2-methoxy-5-methyl-4-(p-methylbenzoylamino)-benzene, 1-amino-2-methoxy-5-methyl-4-(o-methoxybenzoylamino)-benzene, 1-amino-2-methoxy-5-methyl-4-(2'-thienylamino)-benzene, 1-amino-2-methoxy-5-methyl-4-(2'-furoylamino)-benzene, 1-amino-2-methoxy-5-chloro-4-acetylaminobenzene, 1-amino-2-methoxy-5-chloro-4-propionylaminobenzene, 1-amino-2-methoxy-5-chloro-4-benzoylaminobenzene, 1-amino-2-methoxy-5-chloro-4-(o-chlorobenzoylamino)-benzene, 1-amino-2-methoxy-5-chloro-4-(p-chlorobenzoylamino)-benzene, 1-amino-2-methoxy-5-chloro-4-(2',4'-dichlorobenzoylamino)-benzene, 1-amino-2-methoxy-5-chloro-4-(o-methylbenzoylamino)-benzene, 1-amino-2-methoxy-5-chloro-4-(p-methylbenzoylamino)-benzene, 1-amino-2-methoxy-5-chloro-4-(o-methoxybenzoylamino)-benzene, 1-amino-2-methoxy-5-chloro-4-(2'-thienylamino)-benzene, 1-amino-2-methoxy-5-chloro-4-(2'-furoylamino)-benzene, 1-amino-2-methoxy-5-nitro-4-acetylaminobenzene, 1-amino-2-methoxy-5-nitro-4-benzoylaminobenzene, 1-amino-2-methoxy-5-nitro-4-(o-chlorobenzoylamino)-benzene, 1-amino-2,5-diethoxy-4-acetylaminobenzene, 1-amino-2,5-diethoxy-4-benzoylaminobenzene, 1-amino-2,5-diethoxy-4-(2',4'-dichlorobenzoylamino)-benzene, 1-amino-2-methoxy-4-phenacetylaminobenzene, 1-amino-2-methoxy5-phenacetylaminobenzene, 1-amino-2-methoxy-3-phenacetylaminobenzene, 1-amino-2,5-dimethoxy-4-phenacetylaminobenzene, 1-amino-2-methoxy-5-methyl-4-phenacetylaminobenzene, 1-amino-2-methoxy-5-chloro-4-phenacetylaminobenzene, 1-amino-2-methoxy-5-naphthylacetylaminobenzene, 1-amino-2-methoxy-5-phenoxyacetylaminobenzene, 1-amino-2-methoxy-5-(p-chlorophenoxyacetylamino)-benzene, 1-amino-2-methoxy-5-phenylthioacetylaminobenzene, 1-amino-2-methoxy-4-phenylthioacetylaminobenzene, 1-amino-2,5-dimethoxy-4-phenylthioacetylaminobenzene, 1-amino-2-methoxy-5-methyl-4-phenylthioacetylaminobenzene, 1-amino-2-methoxy-5-chloro-4-phenylthioacetylaminobenzene, and 1-amino-2,5-diethoxy-4-(2',4'-dichlorophenylthioacetylamino)-benzene.

The reaction of the aldehydes with the amines is appropriately carried out by heating in an organic solvent.

As cooper-donating agents, the salts of divalent copper, for example copper chloride, copper sulphate and especially copper acetate, are preferably used. If starting from the o'-hydroxy-o-alkoxy-azomethines, a dealkylation takes place simultaneously with the coppering. In that case the reaction appropriately takes place in an organic solvent, for example glycol monomethyl ether or glycol monoethyl ether, dimethylformamide or N-methylpyrrolidone, at temperatures above 100°C, preferably between 140° and 180°C.

Because of their insolubility in the reaction medium, the copper complexes can be isolated by filtration.

The new dyestuffs are valuable pigments which can be used, in a finely divided form, for pigmenting high molecular organic material, for example cellulose ethers and cellulose esters such as ethylcellulose, nitrocellulose, cellulose acetate, cellulose butyrate, polyamides and polyurethanes or polyesters, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures.

It does not matter whether the high molecular compounds mentioned are in the form of plastic masses or melts or in the form of spinning solutions, lacquers, paints or printing inks. Depending on the end use it proves advantageous to use the new pigments as toners or in the form of preparations.

The new dyestuffs are distinguished by outstanding fastness to light, especially in lacquers and on intaglio prints, and by excellent fastness to migration, overlacquering and weathering.

In the examples which follow the parts, unless otherwise indicated, denote parts by weight and the percentages denote percentages by weight.

EXAMPLE 1

18.0 parts of 4-acetylamino-2-amino-1-methoxybenzene and 12.2 parts of salicylaldehyde in 100 parts by volume of glycol monomethyl ether are heated to 120°C, stirred for 1 hour at this temperature and then allowed to cool to 85°C. The mixture is now diluted with 10 parts by volume of alcohol water (1:1) and thereafter with 100 parts by volume of water, and cooled to 25°C, and the yellow precipitate formed is filtered off. The residue is washed with alcohol-water (1:1) and with distilled water and is dried. The yellow crystal powder thus obtained (21.2 parts or 75% of theory) melts at 166° to 167°C.

8.5 parts of this product and 6.0 parts of copper-II acetate monohydrate in 100 parts by volume of glycol monomethyl ether-dimethylformamide (1:1) are heated to 135°C whilst stirring vigorously, stirred for 2.5 hours at this temperature, allowed to cool to 50°C and filtered off warm. The filter residue is successively washed with a 1:1 mixture of glycol monomethyl ether and dimethylformamide, methanol and distilled water and again with methanol and is dried. The resulting pigment is a light green powder and corresponds to the formula (70% of theory) of a yellow powder of melting point 147° to 148°C are obtained.

2. 4-Acetylamino-2-amino-anisole 21 parts of 4-acetylamino-2-nitro-anisole are suspended in 300 parts by volume of absolute alcohol and hydrogenated with hydrogen and Raney nickel for 13 hours at 25°–50°C. The resulting solution is freed of the Raney nickel by filtration and diluted with 4,000 parts by volume of petroleum ether and the precipitate formed is filtered off and dried in vacuo. It is a grey crystal powder which melts at 102° to 103°C. The yield is 15.8 parts (88% of theory).

The table which follows lists further pigments which are obtained in the indicated manner. Column I indicates the base used instead of 4-acetylamino-2-amino-anisole and column II indicates the colour shade of a polyvinyl chloride film dyed with the dyestuff.

| Example No. | I | II |
|---|---|---|
| 2 | 4-Propionylamino-2-amino-anisole | Green-yellow |
| 3 | 4-Butyrylamino-2-aminoanisole | Green-yellow |
| 4 | 4-Acryloylamino-2-amino-anisole | Green-yellow |
| 5 | 4-Stearoylamino-2-amino-anisole | Green-yellow |
| 6 | 4-Phenacetylamino-2-amino-anisole | Green-yellow |
| 7 | 4-Phenoxyacetylamino-2-amino-anisole | Green-yellow |
| 8 | 4-(4-Chlorophenoxyacetylamino)-2-amino-anisole | Green-yellow |
| 9 | 4-(2',5'-Dichlorophenoxyacetylamino)-2-amino-anisole | Yellow |
| 10 | 4-(3'-Phenyl-propionylamino)-2-amino-anisole | Green-yellow |
| 11 | 4-Cinnamoylamino-2-amino-anisole | Green-yellow |
| 12 | 4-phenylmercaptoacetylamino-2-amino-anisole | Green-yellow |
| 13 | 4-(3'-Chloro-4'-methyl-phenylmercaptoacetylamino)-2-amino-anisole | Green-yellow |
| 14 | 4-(4'-Chloro-2'-methyl-phenylmercaptoacetylamino)-2-amino-anisole | Green-yellow |
| 15 | 3-Amino-4-methoxy-carbanilic acid benzyl ester | Green-yellow |
| 16 | 5-Cinnamoylamino-2-amino-anisole | Yellow |
| 17 | 5-Cinnamoylamino-2-amino-4-chloro-anisole | Yellow |
| 18 | 4-(α-Thenoylamino)-2-amino-anisole | Green-yellow |

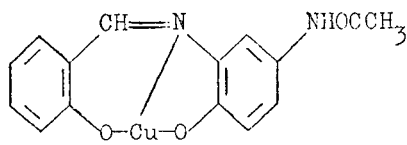

The yield is 7.0 parts (70% of theory).

The new copper complex dyes polyvinyl chloride in green-yellow shades of very good fastness to light and to migration.

4-Acetylamino-2-amino-1-methoxybenzene can be manufactured as follows:

1. 4-Acetylamino-2-nitro-anisole 48 parts of 70 percent strength 4-amino-2-nitro-anisole are dissolved in 350 parts by volume of chlorobenzene and 31 parts by volume of pyridine and 18.8 parts of acetyl chloride are added. In the course thereof, the temperature rises to 60°C. The black solution is stirred for 3 hours at 95°C and allowed to cool to room temperature. The precipitate which hereupon forms is filtered off, washed with petroleum ether, alcohol-water (1:1) and hot water and dried. 29.4 parts

EXAMPLE 19

7.8 parts of 4-cinnamoylamino-2-amino-anisole and 5 parts of 2-hydroxy-1-naphthaldehyde in 70 parts by volume of glycol monomethyl ether are heated to 120°C, stirred for 2 hours at this temperature and cooled. The resulting ochre-yellow precipitate is filtered off, washed with 300 parts by volume of alcohol and 300 parts by volume of distilled water and dried. 9.5 parts (77 percent of theory) of an ochre-yellow powder of melting point 245 to 247°C are obtained.

9.4 parts of this product and 4.4 parts of cooper-II acetate monohydrate in 80 parts by volume of glycol monomethyl ether-dimethylformamide (1:1) are heated to 132°C with vigorous stirring, stirred for 2.5 hours at this temperature and filtered hot. The filter reidue is successively washed with dimethylformamide, methanol and distilled water and again with methanol and is dried. The resulting pigment is a khaki-coloured powder and corresponds to the formula

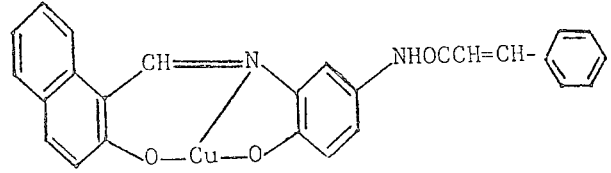

The yield is 7.2 parts (70% of theory). The new copper complex dyes polyvinyl chloride in yellow shades of very good fastness to light and to migration.

EXAMPLE 20

9.0 parts of 4-acetylamino-2-amino-anisole and 10.1 parts of 1-phenyl-3-methyl-4-formyl-pyrazolone-(5)

are reacted in 100 parts by volume of glycol monomethyl ether analogously to Example 1. 17.1 parts (94 percent of theory) of Schiff's base are obtained as a yellow powder of melting point 208° to 210°C.

10.9 parts of this product and 6.0 parts of copper-II acetate monohydrate are coppered under demethylating conditions in 100 parts by volume of a mixture consisting of glycol monomethyl ether and dimethylformamide in the volume ratio of 1:1, analogously to Example 1. The resulting pigment of the formula

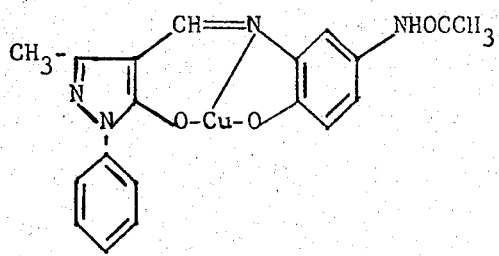

dyes polyvinyl chloride in very greenish-tinged yellow shades of good fastness to light and to migration.

EXAMPLE 21

9 parts of 2-amino-4-acetylamino-anisole, 9.6 parts of 3,5-dichlorosalicylaldehyde and 10 parts of copper-II acetate monohydrate in 160 parts by volume of a mixture consisting of glycol monomethyl ether and dimethylformamide in the volume ratio of 1:1 are heated to 130°C with vigorous stirring, allowed to cool to 110°C and filtered hot. The filter residue is successively washed with dimethylformamide, methanol and hot water, and dried. The resulting pigment is a light green powder and corresponds to the formula

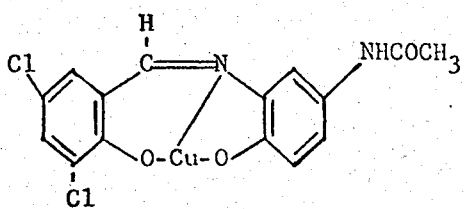

The yield is 12.3 parts. The new copper complex dyes polyvinyl chloride in yellow shades of very good fastness to light and to migration.

The table which follows lists further dyestuffs which are obtained in the indicated manner. Column I indicates the aldehyde, column II the base used instead of 4-acetylamino-2-amino-anisole and column III the colour shade of the polyvinyl chloride film dyed with the copper complex.

at 95°C and allowed to cool to room temperature whilst stirring. The precipitate which hereupon forms is filtered off, washed with petroleum ether, alcohol-water (1:1) and hot water and dried. 49.2 parts (90 percent of theory) of a khaki-coloured crystal powder of melting point 141° to 143°C are obtained.

2. 4-Benzoylamino-2-amino-anisole 40.8 parts of 4-benzoylamino-2-nitro-anisole are suspended in 400 parts by volume of absolute alcohol and hydrogenated with hydrogen and Raney nickel for 4 hours at 25°C. The resulting solution is freed of the Raney nickel by filtration and diluted with 1,400 parts by volume of water and the precipitate formed is filtered off and dried in vacuo. The product is a grey powder which melts at 135° to 136°C. The yield is 30.9 parts (85% of theory).

EXAMPLE 27

10 g of titanium dioxide and 2 g of the pigment manufactured according to Example 1 were ground for 48 hours in a ball mill with 88 g of a mixture of 26.4 g of coconut alkyd resin, 24.0 g of melamine-formaldehyde resin (50% solids content), 8.8 g of ethylene glycol monomethyl ether and 28.8 g of xylene.

A lacquer film was applied to cardboard and stoved for 30 minutes at 120°C.

The fastness to overlacquering was determined by overlacquering the film on the cardboard with a white lacquer which contained 20 percent of titanium dioxide and again stoving for 30 minutes at 120°C. The resulting colouration of the white film was then rated. The heat stability was determined after again stoving samples of the lacquer films for 30 minutes at 120°C and 15 minutes at 180°C. The fastness to light was determined by exposing the samples to the light of a xenon arc lamp and comparing to the Blue Wood Scale [British Standard 1006 (1961)]. It was found that the fastness to light, the heat stability and the fastness to overlacquering are excellent.

EXAMPLE 28

The dihydroxyazomethine-copper-II complex according to Example 1 was incorporated into an emulsion paint.

A paste consisting of 20 parts of the pigment, 80 parts of water and 2.5 parts of sodium dinaphthylmethanedisulphonate was formed and was ground for 48 hours with 60 parts of coarse quartz sand. The sand was removed by sieving. 0.3 part of this paste was mixed

| Example No. | I | II | III |
|---|---|---|---|
| 22 | Salicylaldehyde | 2-Amino-4-acetyl-amino-anisole | Greenish-tinged yellow |
| 23 | 2-Hydroxy-1-naphthaldehyde | 2-Amino-4-acetyl-amino-anisole | Yellow |
| 24 | '' | 2-Amino-4-benzoyl-amino-anisole | Yellow |
| 25 | '' | 2-Amino-4-methyl-5-benzoylamino-anisole | Yellow |
| 26 | 1-Formyl-2-hydroxynaphthalene-3-carboxylic acid | 2-Amino-4-benzoyl-amino-anisole | Yellow |

4-Benzoylamino-2-amino-anisole can be manufactured as follows:

1. 4-Benzoylamino-2-nitro-anisole 38.6 parts of 87% strength of 4-amino-2-nitro-anisole are dissolved in 350 parts by volume of chlorobenzene and 31 parts by volume of pyridine and 33.5 parts of benzoyl chloride are added. Hereupon the temperature rises to 55°C. The black solution is stirred for 3 hours with 30 parts of polyvinyl acetate emulsion and stirred until a homogeneous mixture as obtained, and a film of this sample was applied to carboard. A light yellow pigmentation having excellent properties was obtained.

EXAMPLE 29

15 parts of the product according to Example 1 were stirred into 500 parts of dimethylformamide until a uniform dispersion was obtained. This dispersion was diluted with 8,000 parts of dimethylformamide. 1,500 parts of polyacrylonitrile powder were added to this dispersion and the mixture was stirred at high speed until a uniform lacquer was obtained. After removing the air, the lacquer was suitable for the manufacture of films and filaments since the pigment was present in a highly dispersed form and no large particles could be seen. Films 0.05 cm (20/1,000 inch) thick were spread on glass and immediately dried for 15 minutes at 120°C. Bright, strong, transparent, yellow films having excellent fastness to light were thus obtained.

EXAMPLE 30

65 parts of stabilised polyvinyl chloride, 35 parts of dioctyl phthalate and 0.2 part of the dyestuff obtained according to Example 1, paragraph 2 were stirred together and then milled on a two-roll calender for 7 minutes at 140°C. A yellow-coloured film of very good fastness to light and to migration was obtained.

We claim:

1. A copper complex of an azomethine dyestuff of the formula

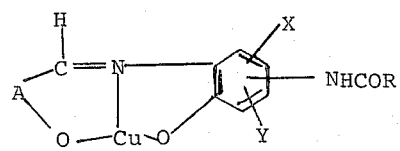

wherein A is

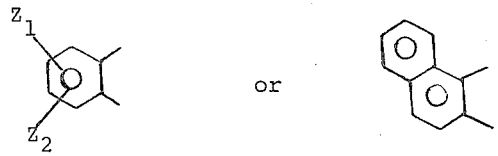

R is alkyl of 1 to 4 carbon atoms, alkoxy of 1 to 4 carbon atoms, phenyl, benzyl, phenylethyl, styryl or phenylamino unsubstituted for substituted by chloro, bromo, alkyl of 1 to 4 carbon atoms, or alkoxy of 1 to 4 carbon atoms, X, Y, $Z_1$ and $Z_2$ is hydrogen, chloro, bromo, alkyl of 1 to 4 carbon atoms, alkoxy of 1 to 4 carbon atoms, or nitro.

2. A compound according to claim 1 having the formula

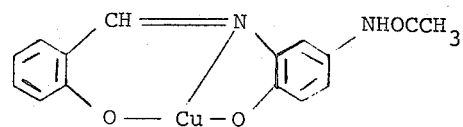

3. A compound according to claim 1 having the formula

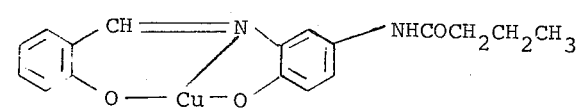

4. A compound according to claim 1 having the formula

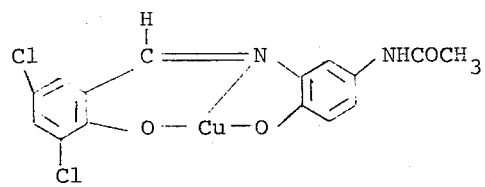

5. A compound according to claim 1 having the formula

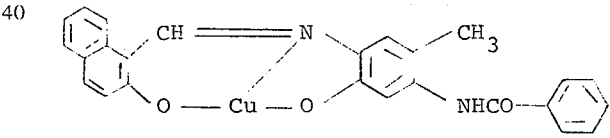

* * * * *